United States Patent Office 3,546,162

Patented Dec. 8, 1970

3,546,162

ORTHO-ESTER STABILIZED POLYVINYL-CHLORIDE RESINS

Louis L. Wood, Potomac, Md., assignor to W. R. Grace & Co., Clarksville, Md., a corporation of Connecticut

No Drawing. Continuation-in-part of application Ser. No. 750,688, May 22, 1968, which is a division of application Ser. No. 612,066, Dec. 12, 1966, which in turn is a continuation-in-part of application Ser. No. 499,093, Oct. 20, 1965, which also in turn is a continuation-in-part of application Ser. No. 403,353, Oct. 12, 1964. This application Dec. 19, 1969, Ser. No. 886,745

Int. Cl. C08f *45/58*

U.S. Cl. 260—45.85 5 Claims

ABSTRACT OF THE DISCLOSURE

Polyvinylchloride resins are thermally stabilized by the addition of an ortho ester having the formula

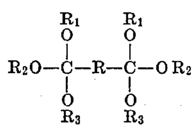

wherein R is alkylene and $R_1$, $R_2$ and $R_3$ are selected from the group consisting of alkyl, phenyl, phenylalkyl and alkylphenylalkyl. The resin may be further stabilized by the addition of a polyhydric alcohol in a concentration of from 1 percent to 10 percent.

This application is a continuation-in-part of my application 750,688, filed May 22, 1968, which is a division of application Ser. No. 612,066, filed Dec. 12, 1966, now abandoned, which is a continuation-in-part of application Ser. No. 499,093, filed Oct. 20, 1965, now abandoned, which in turn is a continuation-in-part of application Ser. No. 403,353, filed Oct. 12, 1964, now abandoned.

The present invention relates to the stabilization of resins, and more specifically to novel stabilization agents for stabilizing vinyl chloride polymers and copolymers against the degradation effects of elevated temperatures.

It is well known that vinyl chloride containing resins degrade at elevated temperatures. When vinyl chloride polymers and copolymers are subjected to molding temperatures in excess of about 150° C. they tend to discolor. Serious discoloration occurs even in the relatively short period of time required for a moulding operation.

To date, numerous stabilizers have been suggested for use in vinyl chloride type resins. The most satisfactory of these stabilizers comprise tin, lead and cadmium containing compounds. These compounds, while performing satisfactorily where toxicity is not a problem, can not be used where the treated polymer is to come into contact with foodstuffs and the like.

As of present, a highly effective polyvinyl chloride stabilizer which does not possess toxic characteristics or propensities has not been developed.

It is therefore, an object of the present invention to provide a novel class of polyvinyl chloride stabilizer.

It is another object to provide novel stabilizers for polyvinyl chloride containing resins which substantially enhance thermal stability of said resins.

It is a further object to provide a class of polyvinyl chloride stabilizers which are non-toxic and may be used in resins which are used in the packaging of foodstuffs materials.

These and still further objects of the present invention will become readily apparent to one skilled in the art from the following detailed description and specific examples.

Broadly, my present invention contemplates as polyvinyl chloride stabilizers compounds containing the following ortho ester grouping:

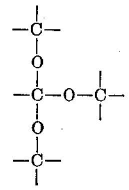

wherein the indicated unsatisfied valences are occupied by hydrogen or organic radicals. It is also contemplated that these ortho esters may be effectively combined with polyhydric alcohols to give a superior degree of stabilization.

More specifically, I have found that if from about 1 percent to about 10 percent by weight of a compound containing an ortho ester grouping is admixed with polyvinyl chloride, the ortho ester compound will stabilize polyvinylchloride towards heat induced degradation. Furthermore, this stabilization effect may be enhanced by the addition of polyhydric alcohols.

The ortho esters used in the practice of the present invention may be broadly defined as those ortho esters which possess at least one of the above defined ortho ester groups, and which are compatible with the polyvinyl chloride resins at the processing temperatures indicated. By the term "compatible," it is meant that the ortho ester used should homogeneously blend with the polyvinyl chloride and should have a relatively low vapor pressure at processing temperatures so as not to cause excessive foaming of the resins at the processing temperatures encountered.

A typical structure of suitable ortho esters which may be used in the practice of my invention is:

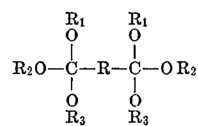

wherein R is alkylene and $R_1$, $R_2$ and $R_3$ may be alkyl, phenyl, phenylalkyl, alkylphenyl and alkyl-phenyl-alkyl.

Specific examples of ortho esters which may be used in the present invention along with a general description of how the ortho ester compound may be prepared are given in the following paragraphs. (The numeral designations will be used in the subsequent specific examples to identify these compounds.)

The following two methods may be used to prepare these ortho esters:

(A) Iminoester route, as set forth in Pinner, Ber., 16 356, 1644 (1883).

The appropriate nitriles are reacted with one equivalent of dry hydrogen chloride and one equivalent of alcohol to form an iminoester hydrochloride which is then alcoholyzed with an excess of alcohol to form the ortho ester. The reaction may be outlined as follows:

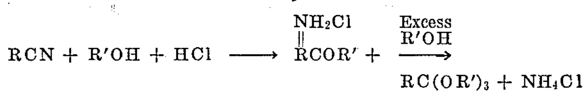

A dinitrile can beused as follows:

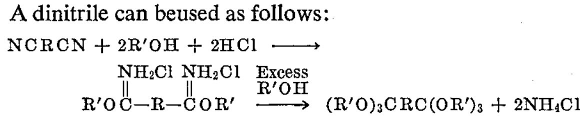

Furthermore, diols may be used at either one or both steps of the synthesis.

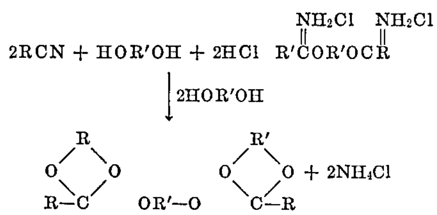

(B) Exchange reaction as described by Mkhitaryan, V. J. Gen. Chem. (U.S.S.R.) 8 1361 (1938).

The alkoxy groups of a readily available ortho ester such as triethyl orthoacetate or formate are displaced by a higher boiling alcohol or polyol as follows:

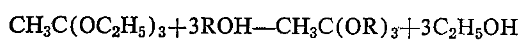

Furthermore, the reaction may be carried out in two steps with two different alcohols or polyols including polyols ranging from diols to hexols. Typically, the reaction may be illustrated for a diol as follows:

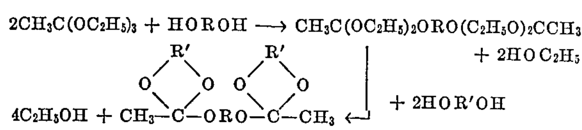

When more complex polyols including triols through hexols are used, many complex polymeric products are possible. However, these reaction products are formed by continuing the reaction until the required amount of lower alcohol has been removed. That is the exchange reaction is continued until the calculated amount of lower alcohol is displaced by the higher alcohols.

(I) $(CH_3CH_2CH_2O)_3C(CH_2)_4C(OCH_2CH_2CH_3)_3$

This compound is prepared by route A or B.

(II) $(CH_3O)_3C(CH_2)_4C(OCH_3)_3$

This compound is prepared by route A.

(III) $(C_2H_5O)_3C(CH_2)_4C(OC_2H_5)_3$

This compound is prepared by route A.

(IV)

$$\left(\left(C_6H_5\right)-CH_2-O\right)_3-C-\left(CH_2\right)_4-C-\left(O-CH_2-\left(C_6H_5\right)\right)_3$$

This compound is prepared by route A.

(V)

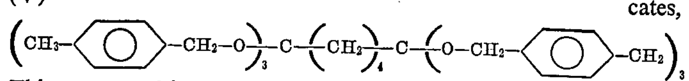

This compound is prepared by route A.

The effectiveness of the present ortho ester stabilizers may be enhanced by adding thereto from about 0.1 to about 10 moles of a high boiling alcohol per mole of ortho ester.

Typical alcohols which may be added possess the general structure $$R'(OH)_x$$

wherein R′ is an organic radical and $x$ has a value of from 1 to 6. Preferably, these alcohols have a boiling point in excess of about 175° C.

In the above formula, R′ may be alkyl, alkylphenyl, phenylalkyl, alkylene, phenylene, polyalkoxyalkylene and trivalent counterparts thereof. Typical polyhydric alcohols useful in the practice of the present invention are $o$, $m$, $p$-xylene, $\alpha,\alpha$-diol, trimethylolpropane monopropyl ether, trimethylolpropane monoallyl ether, propylene glycol, diethylene glycol, dimethyloctadiynediol, pentaerythritol, trimethylolpropane, neopentylglycol, benzylalcohol, cetyl alcohol and dipentaerythritol.

Polyvinyl chlorides which are treated in accordance with the practice of my present invention are those vinyl chloride polymers and vinyl chloride copolymers having a number average molecular weight from about 10,000 to about 150,00 and a weight average molecular weight of from about 20,000 to 1,000,000. These vinyl chloride polymers and copolymers are well known to those skilled in the art, and comprise vinyl chloride homopolymers as well as vinyl chloride copolymers which are prepared by copolymerizing vinyl chloride with a copolymerizable monomer such as unsaturated esters which include vinyl acetate, vinyl formate, vinyl benzoate, vinyl stearate, vinyl oleate, as well as diethyl maleate and diethyl formate. Copolymers may also be prepared by copolymerizing vinyl chloride with an acrylic ester such as methyl-, ethyl-, butyl- and octyl acrylate. It is also contemplated that the vinyl chloride copolymers may be prepared by polymerizing vinyl chloride with vinylidene chloride. The above mentioned copolymers may contain from 0 to 20, and even 40 percent by weight of copolymerizable monomer.

The stabilization agents, namely the ortho esters contemplated herein, are incorporated with the vinyl chloride polymer and copolymers by any conventional means. The blending may be conveniently carried out first by preparing a slurry of finely divided polymer in a solvent for the ortho ester such as methanol, acetone, ethyl ether. The solution is then separated from the slurry and the polymer particles which are thoroughly coated with the ortho esters set forth herein. It is also contemplated that the blending may be achieved by milling the polymer at the softening temperatures therefor until an intimate blend of the stabilization agent with the polymer is achieved. Milling is generally conducted at conventional temperatures of 150 to 200° C. for a period of time sufficient to obtain thorough blending of the stabilization agent with the polymer.

The stabilized vinyl chloride polymers and copolymers contemplated herein may be used in the formation of rigid polyvinyl chloride molded articles. These rigid molded pieces are formed in extrusion and injection molding devices which are well known to those skilled in the art and which operate in the neighborhood of 150 to 200° C. The stabilization agents contemplated herein effectively stabilize the vinyl chloride polymer and copolymer during the molding process and make it possible to produce rigid moldings having a low degree of color change and good clarity.

It is also contemplated that the polyvinyl chloride resins stabilized by the present stabilizers may be admixed with various plasticizers such as high boiling esters including the alkyl phthalates, phosphates, adipates, sebacates, azelates, and various polymeric type ester plasticizers. Also, the present composition may contain other additives such as Zn, Mg, Sn and Ca salts of carboxylic acids, and phosphate esters. Furthermore, the resins may be included in plastisol type preparations which are fabricated by dipping and deposit type molding techniques.

Having described the basic aspects of my present invention, the following specific examples are given to illustrate embodiments thereof.

EXAMPLE I

A 4 liter resin kettle is fitted with a stirrer, thermometer, gas inlet tube and a drying tube, 540 g. (5 moles) of adipionitrile, 320 g. (10 moles) of methanol and 2000 ml. of chloroform are added and the mixture stirred. Over a period of 1.5 hours, 410 g. (11.2 moles) of dry hydrogen chloride is passed into this mixture, maintaining the temperature at 5° C. to 20° C. The mixture is then stirred for an additional 20 hours and maintained at 10° C. to 20° C. A white solid product of dimethyl diiminoadipate dihydrochloride is recovered in 93 percent yield (1140 g.).

Using an 8 liter pot fitted with a stirrer and drying tube, 1029 g. (4.2 moles) of dimethyl diiminoadipate dihydrochloride is added to 12.5 moles of dry methanol. This mixture is maintained at 25° C. and stirred for 12 hours. Ammonium chloride crystals form and settle out. These crystals are removed by filtration, and the volatile solvents removed from the filtrate by evaporation at 30° C. and 20 to 30 mm. of mercury pressure. This residue forms an upper and lower oil layer, the upper layer is separated and the lower layer washed with ethyl ether (3 times). The wash liquor is combined with the separated upper layer and passed through a celite fitter to remove turbidity. This filtrate is concentrated by evaporation at 30° C. and 20 to 30 mm. Hg, to yield a pale yellow oil. This oil is washed with 250 ml. of cold 5 percent aqueous sodium bicarbonate, followed by 250 ml. of cold water and 250 ml. of 5 percent cold aqueous brine. The organic oil phase is dried, filtered free of any solids and further concentrated by evaporation at 30° C. and 20 to 30 mm. of Hg. This oil is distilled and a colorless hexamethyl orthoadipate liquid recovered in 59.3 percent yield (Formula II).

EXAMPLE II

A white solid product of diethyl diiminoadipate dihydrochloride is produced, using the apparatus and procedure of Example I by substituting ethanol for methanol.

Using an 8 liter pot fitted with a stirrer and drying tube, 274 g. (1 mole) if diethyl diiminoadipate dihydrochloride is added to 15 moles of dry ethanol. This mixture is maintained at 25° C. and stirred for 20 hours. Ammonium chloride crystals form and settle out. These crystals are removed by filtration, and the volatile solvents removed from the filtrate by evaporation at 30° C. and 20 to 30 mm. of mercury pressure. The residue is added to 500 ml. of chloroform and this mixture is washed with 300 ml. of cold 15 percent aqueous sodium carbonate followed by 250 ml. of cold water. The organic layer is separated, dried and concentrated by evaporation at 30° C. and 20 to 30 mm. of Hg. The resulting oil is distilled and a colorless hexamethyl orthoadipate liquid recovered in 56.1 percent yield (Formula III).

EXAMPLE III

A white solid product of dipropyl diiminoadipate dihydrochloride is produced using the method and apparatus of Example I by substituting propanol for methanol.

Using an 8 liter pot fitted with a stirrer and drying tube, 302 g. (1 mole) of dipropyl diiminoadipate dihydrochloride is added to 15 moles of dry propanol. This mixture is maintained at 25° C. and stirred for 20 hours. Ammonium chloride crystals form and settle out. These crystals are removed by filtration, and the volatile solvents removed from the filtrate by evaporation at 30° C. and 20 to 30 mm. of mercury pressure. The residue yellow oil is added to 500 ml. of chloroform and is washed with 300 ml. of cold 15 percent aqueous sodium bicarbonate, followed by 250 ml. of cold water. The organic oil phase is dried, filtered free of any solids and further concentrated by evaporation at 30° C. and 20 to 30 mm. of Hg. This oil is distilled and a colorless hexapropyl orthoadipate product is recovered in 52 percent yield (Formula I).

EXAMPLE IV

The same method and apparatus of Example III is used, except that benzyl alcohol is substituted for propanol to produce both the intermediate dihydrochloride and the orthoester product hexatolyl orthoadipate of Formula IV.

EXAMPLE V

In the following runs, particulate polyvinyl chloride having a number average molecular weight of about 38,000 was blended with various amounts of orthoester and/or polyhydric alcohol. These samples were then placed in the mixing chamber of a Brabender Plastograph at 190° C. and open to the air. A roller speed of 60 r.p.m. was used to knead the polymer formulations. The Brabender Plastograph continuously records the torque required to knead the mass. From the torque valves one can determine:

(a) The time required for the powder mixture to fuse into a workable plastic mass (flux time).

(b) The force required to work the plastic mass (average torque value).

(c) The onset of crosslinking (decomposition time). The actual temperature of the plastic mass was also continuously measured. Small samples of the polymers were also removed periodically from the mixing chamber and their color compared to those of the standard Gardner scale.

TABLE 1

| Run | Stabilizer (numerals refer orthoester described previously) | Concentration, parts per hundred | Flux time, min. | Decomposition time after flux, min. | Torque, kg. | Polymer, temp. | Color (Gardner Scale 0=Colorless; 15=Brown | | | | |
|---|---|---|---|---|---|---|---|---|---|---|---|
| | | | | | | | 2 min. | 4 min. | 10 min. | 15 min. | 20 min. |
| 1 | TMPA* | 2.0 | 1.0 | 3.0 | 1.9–2.2 | 180–194° | (1) | | | | |
| 2 | II | 5.0 | 2.0 | 14.0 | 1.3–1.4 | 190–203° | 1.8 | 1.8 | 1.8 | 1.8 | |
| 3 | II | 4.0 | 3.0 | 9.0 | 1.1–1.4 | 194–203° | 1.8 | 1.8 | 1.8 | | |
| 4 | II | 3.0 | 2.5 | 6.5 | 1.4 | 193–201° | 1.8 | 1.8 | | | |
| 5 | II | 2.0 | 2.5 | 4.5 | 1.3–1.4 | 194–200° | 2.5 | 3.0 | | | |
| 6 | II | 1.0 | 4.0 | 2.0 | 1.3–1.5 | 180–188° | 1.0 | 2.0 | | | |
| 7 | {II<br>Benzyl alcohol} | 4.0<br>1.0 | 2.0 | 15.5 | 1.3–1.4 | 190–206° | 0.5 | 0.5 | 0.5 | 0.5 | |
| 8 | {II<br>Benzyl alcohol} | 3.0<br>2.0 | 2.5 | 11.0 | 1.3–1.4 | 190–200° | 0.5 | 1.0 | 1.5 | | |
| 9 | {II<br>Benzyl alcohol} | 2.0<br>3.0 | 3.5 | 4.5 | 1.1–1.5 | 186–198° | 0 | 0.2 | | | |
| 10 | II | 5.0 | 2.0 | 16 | 1.1–1.3 | 190–199° | 1.5 | 4.5 | 5.0 | 8.0 | |
| 11 | II (TMPA)* | 5.0<br>2.0 | 2.0 | 19 | 1.1–1.4 | 188–206° | 1.0 | 1.5 | 4.0 | 4.0 | 12 |
| 12 | III | 5.0 | 2.0 | 5.0 | 1.2–1.4 | 195–200° | 2.0 | 2.0 | | | |
| 13 | I | 5.0 | 1.0 | (2) 12–21 | 1.6–1.8 | 181–210° | 2.2 | 3.0 | 10.5 | 15 | 15 |
| 14 | IV | 5.0 | 2.5 | 4.5 | 1.3–1.5 | 190–210° | 2.5 | 3.0 | 3.0 | | |
| 15 | {Cetyl alcohol<br>Stearic acid} | 5.0<br>0.5 | 0 | 5.5 | 1.9–2.1 | 192–210° | 15 | (3) | | | |
| 16 | m-Xylene a,a'-diol | 2.0 | 3.5 | 10–13.5 | 1.9–1.5 | 190–210° | 15 | (3) | | | |
| 17 | p-Xylene a,a' diol | 2.0 | 3.5 | 3.0–8.0 | 1.9–1.7 | 190–210° | 15 | (3) | | | |

[1] Blend.
[2] Ill-defined.
[3] Black.
*Trimethylolpropane monoallyl ether.

What is claimed is:

1. A thermally stabilized polyvinyl chloride composition comprising polyvinylchloride and an ortho ester compound of the formula

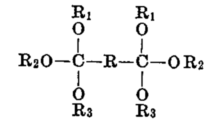

wherein R is alkylene and $R_1$, $R_2$ and $R_3$ are selected from the group consisting of alkyl, phenyl, phenylalkyl, alkylphenyl and alkylphenylalkyl.

2. A composition as in claim 1 which contains from about one to about 10 percent by weight of an alcohol having a boiling point in excess of about 175° C., and having the formula $R(OH)_x$ wherein R is an organic radical and $x$ has a value of from 1 to 6.

3. A composition as in claim 1 wherein said ortho ester compound is hexamethyl orthoadipate.

4. A composition as in claim 1 wherein said ortho ester compound is hexaethyl orthoadipate.

5. A composition as in claim 1 wherein said ortho ester compound is hexapropyl orthoadipate.

References Cited

UNITED STATES PATENTS 2,789,101 4/1957 Wilson ------------ 260—31.8

DONALD E. CZAJA, Primary Examiner

M. J. WELSH, Assistant Examiner

U.S. Cl. X.R.

260—18, 30.6, 31.8, 45.7, 45.95